Sept. 25, 1923.
G. REICHSTETTER, JR., ET AL
1,468,869
VEHICLE BUMPER AND FENDER
Filed May 24, 1923
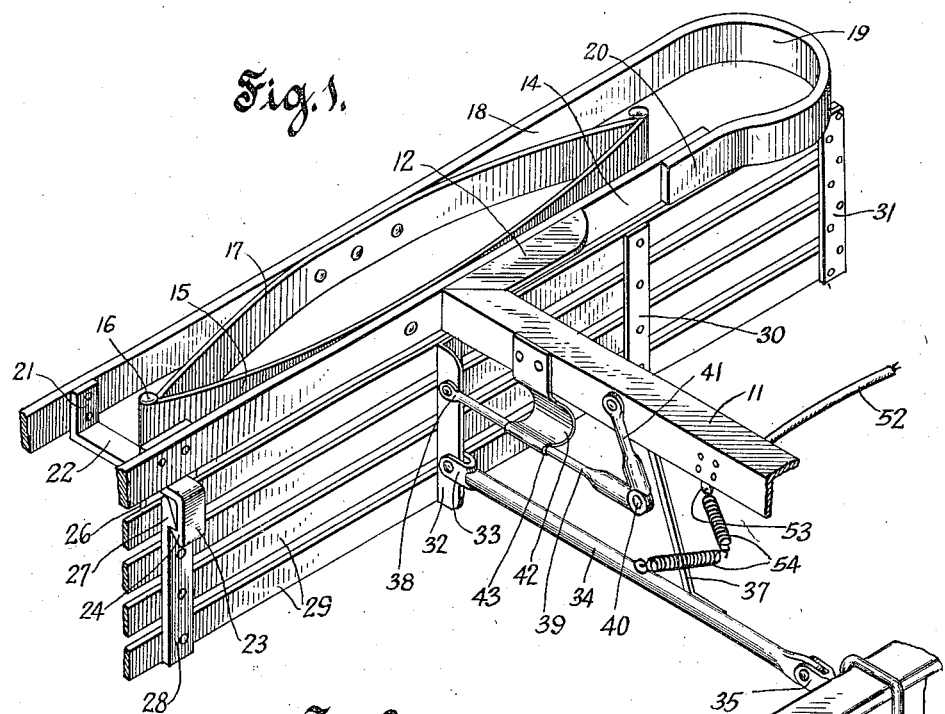
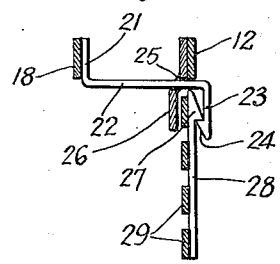
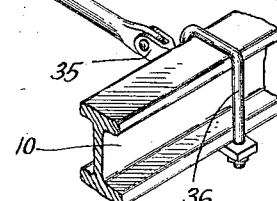
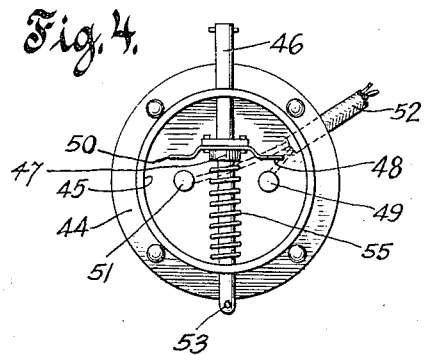
INVENTORS
George Reichstetter, Jr.
Otto E. Reichardt
BY Fred C. Fischer
ATTORNEY Patented Sept. 25, 1923.

1,468,869

UNITED STATES PATENT OFFICE.

GEORGE REICHSTETTER, JR., OF NEWARK, AND OTTO E. REICHARDT, OF IRVINGTON, NEW JERSEY.

VEHICLE BUMPER AND FENDER.

Application filed May 24, 1923. Serial No. 641,034.

*To all whom it may concern:*

Be it known that we, GEORGE REICHSTETTER, Jr., and OTTO E. REICHARDT, both citizens of the United States, and residents, respectively, of Newark and Irvington, both in the county of Essex and State of New Jersey, have invented certain new and useful Improvements in Vehicle Bumpers and Fenders, of which the following is a specification.

This invention relates to devices carried at the front of motor propelled vehicles for reducing the shock caused by impact of the vehicle with an obstruction, lessening the effects of such collision, both to the vehicle and object encountered.

One of the objects is to provide a simple and effective bumper of neat appearance, composed of resilient elements and adapted to be readily applied to any type of self-propelled wheeled vehicle.

Another purpose is to produce a fender associated with and supported by the bumper in such manner as to automatically assume an operative position coincidentally with an operative movement of the bumper.

A further aim is in the provision of means for short circuiting and rendering inoperative the electric current as used to energize the spark plugs of the motor driving the vehicle, said means becoming instantly operative upon lowering of the fender.

These and other advantageous objects, as will later appear, are secured by the novel construction, arrangement and combination of parts hereafter described and shown in the annexed drawing, constituting an essential part of the disclosure, and in which:—

Figure 1 is a perspective view of slightly more than half of the length of a bumper and fender made in accordance with the invention and illustrating its connection with a vehicle.

Figure 2 is a transverse sectional view approximately at its center.

Figure 3 is a perspective view showing the clip or keeper guard in detail.

Figure 4 is a plan view of the electric switch operated by release of the fender.

In the drawing a fragment of the front axle is designated by the numeral 10 and one of a pair of like supports 11 the same being made, as shown, of rolled steel angles rigidly fixed to the forward parts of the chassis or vehicle frame to extend in advance thereof, their ends 12 being turned oppositely outward.

These ends are fixedly secured to a plain straight horizontal bar 14 extending across the front of the vehicle at a suitable height from the ground level.

Riveted to the bar 14, adjacent the support ends 12, are single leaf, semi-elliptical spring elements 15 connected at their ends 16 with co-operative spring elements 17, which latter elements are similarly riveted at their centers to an outer or contact bar 18, thereby supporting the same at a spaced distance in front of and in the same horizontal plane as the bar 12.

The contact bar 18 is bent at its ends into curved bights 19 terminating in inwardly turned straight flat clips 20, parallel with the bar 18 and adapted to make contact with the ends of the bar 14 on the sides to which the supports are attached, the proportion of these elements being such as to maintain the springs under compression at all times and when the springs yield, under contact with an object, to prevent their excessive rebound.

Fixed to the center of the bar 18 is the angular foot 21 of detent bar 22 having a downturned portion 23 presenting a bevelled barb-like detent 24.

The bar 22 passes through an opening 25 formed in an offset keeper plate 26 secured to the bar 14 to guide and support the detent, slidably holding the detent bar closely adjacent the lower edge of the bar 14.

The detent 24 normally engages with a correspondingly shaped catch 27 formed on the end of a strip 28 attached in perpendicular position to a plurality of fender bars 29, secured in spaced relation by cleats 30 disposed at intervals along their length, the ends of the bars 29, which may be curved towards the vehicle body, being held by end cleats 31 which extend outward an equivalent distance to the bight of the curves 19.

It will be noticed that the several fender bars are positioned in a vertical plane, below the bumper bar 14 and that the uppermost fender bar is prevented from moving forward or outward by the offset portion of the keeper plate 26.

In addition to the cleats 30, the fender bars have secured to them angle strips 32 pivotally engaged at their lower ends by forks 33 formed on the ends of radius rods 34 the other ends of which are pivoted in clevises 35 fixed to yokes 36 securely bolted to the front axle 10, and fixed to the radius rods 34 are braces 37 extending angularly outward and pivotally engaging the cleats 30.

Pivotally attached to the angles 32, near their upper ends, are eyes 38 formed in the lower members 39 of support rods, these lower members being normally substantially horizontal and engaged at their opposite ends by pivot joints 40 with upper members 41, in turn pivoted to the supports 11, it being understood that the combined length of the rod members 39 and 41 limits the distance which the fender can move downwardly.

In order to prevent vibration or end movement of the fender and also to insure intimate and constant contact between the detent 24 and catch 27, bent flat springs 42 are fixed on the supports 11, these springs being bowed and curved to present clips 43 partially encircling and resting on the support rod members 39 tending to press the same firmly down and prevent lateral action of any moment.

Held to the under side of one of the angle supports 11 is a casing 44 having a cylindrical extension 45 through the diametrical center of which passes a vertical rod 46 carrying a fixed collar 47 upon which is mounted a contact having opposed ends 48 and 50 adapted, when the rod is drawn down, to engage the fixed terminals 49 and 51 of an electric circuit, current entering by the cable 52.

This rod 46 is provided at its lower extending end with an eye 53 to which is attached one end of a coiled tension spring 54, the other end of which is secured to the adjacent radius bar 34, this spring being normally free and becoming operative only upon lowering of the fender, whereupon it will overcome the effect of the coiled spring 55 encircling the rod 46 within the casing and normally supporting the rod to keep the contacts out of engagement with the terminals.

In operation, the parts being in their normal position, as indicated in Fig. 1, should the bar 18 make forcible contact with an object, the bumper will yield and the bar 18 moving backward or towards the vehicle, will obviously carry the detent 24, releasing it from the catch 27 and permit the fender to drop by gravity to the limit of the support rods 39—41.

Thus the fender will be suspended by the said rods and held in an operative position by the radius rods 34 at some distance below the bumper, clearing the ground surface however and effectually preventing the encountered object from being run over by the vehicle.

As the fender drops, stress is transmitted through the spring 54 to the electric switch, closing the contacts and short circuiting the current to the spark plugs, thus rendering the motor inoperative until the parts have been readjusted.

The aforegoing disclosure is to be regarded as descriptive and illustrative only, and not as restrictive or limitative of the invention, of which obviously an embodiment may be constructed including many modifications without departing from the general scope herein indicated and denoted in the appended claims.

Having thus described our invention, what we claim as new and desire to secure by Letters Patent, is:—

1. The combination with a vehicle bumper having a spring supported outer bar and a fixed inner bar, of a fender, and a single support for said fender, said support becoming disengaged upon the recession of said outer bar.

2. The combination with a vehicle bumper having a spring supported outer bar and a fixed inner bar, of a fender, a single central support for said fender, a guide for said support, and means on said fender engaging said support when in normal position and to become released therefrom upon recession of said outer bar.

3. The combination with a vehicle bumper having a spring supported outer bar and a fixed inner bar, of a fender, a single central support for said fender, said support releasing the fender upon recession of said bar, and means for suspending said fender in a lower plane after the release of said support.

4. The combination with a vehicle bumper having a spring supported outer bar and a fixed inner bar, of a fender, a single central support for said fender, said support releasing the fender upon recession of said bar, and radius rods pivotally connecting between said fender and the front axle of the vehicle.

5. The combination with a vehicle bumper having an inner bar, a spring extended outer bar and rigid supports engaging said inner bar to the frame of the vehicle, of a fender having a catch, a detent carried by said outer bar, said detent becoming disengaged upon the rearward movement of said outer bar, hingedly jointed support rods pivotally engaged at their ends respectively to said fender and said rigid supports, one of each of the elements of said rods being normally horizontal, and spring clips fixed to said rigid supports, said clips partially surrounding and yieldingly engaging the horizontal elements of said support rods.

6. The combination with a motor driven vehicle bumper having a yieldable front bar, of a fender supported by said bumper, means for releasing said fender operated by recession of said front bar, hingedly jointed suspension rods pivoted respectively to the bumper supports and fender, said rods becoming operative upon release of the fender supports, and means carried by the bumper supports for guiding and exerting pressure on said rods when inoperative.

7. The combination with a motor driven vehicle bumper having a yieldable front bar, of a fender supported by said bumper, means for releasing said fender operated by recession of said front bar, hingedly jointed suspension rods pivoted respectively to the bumper supports and fender, said rods becoming operative upon release of the fender supports, means carried by the bumper supports for guiding and exerting pressure on said rods when inoperative, and radius rods pivotally engaging said fender with the front axle of the vehicle.

8. The combination with a motor driven vehicle bumper having a yieldable front bar, of a fender supported by said bumper, means for releasing said fender operated by recession of said front bar, means for suspending said fender in a lower plane after its release, an electric switch controlling current to the firing devices of the vehicle motor, and means actuated by the release of said fender to operate said switch.

This specification signed and witnessed this 5th day of May, 1923.

GEORGE REICHSTETTER, Jr.
OTTO E. REICHARDT.

Witnesses:
FREDK. C. FISCHER,
WM. F. ROGGE.